US012148041B2

(12) United States Patent
Ganguly et al.

(10) Patent No.: US 12,148,041 B2
(45) Date of Patent: *Nov. 19, 2024

(54) SYSTEMS AND METHODS FOR ALLOCATING ASSETS TO DIRECTED AND INTEREST-BASED PARTICIPANTS

(71) Applicant: Click IPO Holdings, LLC, Scottsdale, AZ (US)

(72) Inventors: Sukanta Ganguly, San Jose, CA (US); Bradley Shaw, Scottsdale, AZ (US); Scott Coyle, Scottsdale, AZ (US); James K. Farrelly, Scottsdale, AZ (US)

(73) Assignee: Click IPO Holdings, LLC, Scottsdale, AZ (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/298,079

(22) Filed: Apr. 10, 2023

(65) Prior Publication Data
US 2023/0245237 A1 Aug. 3, 2023

Related U.S. Application Data

(63) Continuation of application No. 16/730,052, filed on Dec. 30, 2019, now Pat. No. 11,640,640, which is a (Continued)

(51) Int. Cl.
G06Q 40/06 (2012.01)
G06Q 40/02 (2023.01)
G06Q 40/04 (2012.01)

(52) U.S. Cl.
CPC ............ G06Q 40/06 (2013.01); G06Q 40/02 (2013.01); G06Q 40/04 (2013.01)

(58) Field of Classification Search
CPC ...................................................... G06Q 40/00
See application file for complete search history.

(56) References Cited

U.S. PATENT DOCUMENTS 7,016,872 B1 3/2006 Bettis
7,509,274 B2 3/2009 Kam
(Continued)

OTHER PUBLICATIONS

ISR/WO mailed Apr. 15, 2019 for PCT/US 19/14551 filed Jan. 22, 2019, 8 pages.
(Continued)

Primary Examiner — Ojo O Oyebisi
(74) Attorney, Agent, or Firm — Snell & Wilmer L.L.P.

(57) ABSTRACT

In one aspect, a share data allocation (SDA) computing device is provided. The SDA computing device includes at least one processor in communication with a database. The at least one processor is configured to receive direct-share participant (DSP) request data indicating an amount each DSP is willing to invest and receive interest-based participant (IBP) request data indicating an amount each IBP is willing to invest. The at least one processor is also configured to apply a first mapping algorithm to the DSP request data and apply a second mapping algorithm to the IBP request data. The at least one processor is further configured to calculate a preliminary allocation of a total amount of assets among the DSPs and the IBPs according to results of an apportionment, and direct allocation of the total amount of assets among the DSPs and the IBPs according to results of a join operator.

20 Claims, 6 Drawing Sheets

Related U.S. Application Data continuation-in-part of application No. 16/253,657, filed on Jan. 22, 2019, now abandoned.

(60) Provisional application No. 62/787,326, filed on Jan. 1, 2019, provisional application No. 62/620,485, filed on Jan. 23, 2018.

(56) References Cited

U.S. PATENT DOCUMENTS

| | | |
|---|---|---|
| 8,275,690 B2 | 9/2012 | Wallman |
| 8,589,269 B1 | 11/2013 | Bendel |
| 10,719,877 B2 | 7/2020 | Phillips |
| 11,348,095 B2 | 5/2022 | Fletcher |
| 2002/0010672 A1 | 1/2002 | Waelbroeck |
| 2003/0055758 A1 | 3/2003 | Sidhu |
| 2004/0039685 A1 | 2/2004 | Hambrecht |
| 2007/0118463 A1 | 5/2007 | Avery |
| 2007/0150405 A1 | 6/2007 | Greenberg |
| 2010/0005035 A1 | 1/2010 | Carpenter |
| 2012/0239553 A1 | 9/2012 | Gonen |
| 2012/0254065 A1 | 10/2012 | Mintz |
| 2013/0097059 A1 | 4/2013 | Bonner |
| 2013/0179259 A1 | 7/2013 | Lindauer |
| 2013/0297484 A1* | 11/2013 | Lawrence .............. G06Q 40/00 705/37 |
| 2016/0267587 A1 | 9/2016 | Woltsovitch |
| 2019/0026830 A1 | 1/2019 | Powell |
| 2019/0068380 A1 | 2/2019 | Tang |
| 2020/0314834 A1 | 10/2020 | Lei |
| 2020/0396065 A1 | 12/2020 | Gutierrez-Sheris |
| 2021/0182966 A1 | 6/2021 | Toffey |

OTHER PUBLICATIONS

Shanuganthan, M., "Behavioural finance in an era of artificial intelligence: Longitudinal case study of robo-advisors in investment decisions," in Journal of Behavorial and Experimental Finance, vol. 27, Sep. 2020.

* cited by examiner

SYSTEMS AND METHODS FOR ALLOCATING ASSETS TO DIRECTED AND INTEREST-BASED PARTICIPANTS

CROSS REFERENCE TO RELATED APPLICATIONS

This application is a continuation of and claims priority to U.S. patent application Ser. No. 16/730,052, filed Dec. 30, 2019, which claims the benefit of, and priority to U.S. Provisional Patent Application No. 62/787,326, filed on Jan. 1, 2019, and is a continuation-in-part of U.S. patent application Ser. No. 16/253,657, filed Jan. 22, 2019, which claims the benefit of, and priority to U.S. Provisional Patent Application No. 62/620,485, filed on Jan. 23, 2018, the disclosures of which are hereby incorporated by reference herein in their entireties.

BACKGROUND

The field of the disclosure relates generally to allocation of assets in an offering, and more specifically to systems and methods for allocating assets to individual participants in an integrated process that includes direction of the issuing party and through an identification of interest.

Computer systems are used to increase the ease and efficiency of various processes. Computer systems include computing devices that are capable communicating with each other and making decisions (e.g., generate particular output values) in response to received input values. Computing devices make decisions by applying rules (e.g., a formula or algorithm) to received input values. However, computing devices are generally not capable of quantifying human behavior and decision-making, because human behavior and decision-making do not follow fixed rules and depend on individual human biases that are imperceptible to a computing device.

Currently, computer systems are not typically used for asset allocation in initial public offerings (IPOs) of shares in a company, secondary offerings of shares, or other public offerings of assets. In a public offering such as an IPO, an issuer sells shares of a corporation to investors, such as individual investors and institutional investors (e.g., banks, insurance companies, hedge funds, and mutual funds). Issuers generally favor investors who engage in certain investing behaviors, such as holding assets acquired in an IPO over a long period of time, so as to reduce volatility in the price of the assets. These favored investors may be offered directed assets by the issuer. The company may also wish to direct shares to other potential investors, such as friends and family of members of the principals of the company. In other words, an issuer may choose to offer assets to an individual investor before offering assets to other investors. These subjective judgements are often products of biases of the issuers.

Individual investors typically will rely on a broker-dealer to be notified of and to acquire assets in an IPO. A broker-dealer, in deciding whether to notify an individual investor of an IPO, typically may use a computer system to manually review the records of individual investors with whom the broker-dealer has done business in the past, referred to as "historical investors" of the broker dealer, but then must make a subjective judgement as to the candidate investor's interest and ability to take part in the IPO. Further, a broker-dealer who has obtained the right to receive a certain quantity of assets in an IPO for offer to a plurality of individual investors must make subjective judgements in allocating the quantity of assets among the individual investors. These subjective judgements are often products of biases of the broker-dealers. Moreover, there is no known process for accommodating offers to individual investors who are identified as potentially interested simultaneously with directed share investors during the actual allocation of assets. Consequently, the offering of assets to individual investors is typically inefficient and reduces the value available to the issuer and the opportunities available to investors.

It is therefore desirable for a computing device to be capable of allocating assets to individual investors in an integrated process that takes into account directed-asset participants and interest-based participants, so that the process of allocating assets in the offering can be implemented by a computer system in a manner that makes efficient use of computer resources, is predictable, repeatable, and verifiable for auditing purposes, and is favorable to issuers and investors across any number of broker-dealers.

BRIEF DESCRIPTION

In one aspect, a share data allocation (SDA) computing device is provided. The SDA computing device includes at least one processor in communication with a database. The at least one processor is configured to receive, from a plurality of direct-share participants (DSPs), DSP request data indicating an amount of money each DSP is willing to invest in a public offering. The plurality of DSPs are a first set of individual investors identified as eligible for directed shares by an issuer of the public offering. The at least one processor is further configured to receive, from a plurality of interest-based participants (IBPs), IBP request data indicating an amount of money each IBP is willing to invest in the public offering. The plurality of IBPs are a second set of individual investors identified as suitable for the public offering based on past investment activity of the respective IBPs. The at least one processor is also configured to apply a first mapping algorithm to the DSP request data to allocate among the DSPs a first portion of a total amount of assets available to the first and second sets of individual investors and apply a second mapping algorithm, different from the first mapping algorithm, to the IBP request data to allocate among the IBPs a second portion of the total amount of assets available to the first and second sets of individual investors. The at least one processor is yet further configured to receive a notification of the total amount of assets available in the public offering to the first and second sets of individual investors, apportion the total amount into the first portion and the second portion, calculate a preliminary allocation of the total amount of assets among the DSPs and the IBPs according to results of the apportionment, the first mapping algorithm, and the second mapping algorithm, and apply a join operator to the preliminary allocation. The join operator adjusts the preliminary allocation to at least one individual investor of the first and second sets of individual investors. The at least one processor is further configured to direct allocation of the total amount of assets among the DSPs and the IBPs according to results of the join operator.

In another aspect, a computer-implemented method is provided. The computer-implemented method is implemented by a share data allocation (SDA) computing device including at least one processor in communication with a database. The method includes receiving, from a plurality of direct-share participants (DSPs), DSP request data indicating an amount of money each DSP is willing to invest in a public offering. The plurality of DSPs are a first set of individual investors identified as eligible for directed shares by an issuer of the public offering. The method also includes receiving, from a plurality of interest-based participants (IBPs), IBP request data indicating an amount of money each IBP is willing to invest in the public offering. The plurality of IBPs are a second set of individual investors identified as suitable for the public offering based on past investment activity of the respective IBPs. The method also includes applying a first mapping algorithm to the DSP request data to allocate among the DSPs a first portion of a total amount of assets available to the first and second sets of individual investors, applying a second mapping algorithm, different from the first mapping algorithm, to the IBP request data to allocate among the IBPs a second portion of the total amount of assets available to the first and second sets of individual investors, and receiving a notification of the total amount of assets available in the public offering to the first and second sets of individual investors. The method further includes apportioning the total amount into the first portion and the second portion, calculating a preliminary allocation of the total amount of assets among the DSPs and the IBPs according to results of the apportionment, the first mapping algorithm, and the second mapping algorithm, and applying a join operator to the preliminary allocation. The join operator adjusts the preliminary allocation to at least one individual investor of the first and second sets of individual investors. The method further includes directing allocation of the total amount of assets among the DSPs and the IBPs according to results of the join operator.

In yet another aspect, a non-transitory computer-readable storage media is provided. The non-transitory computer-readable storage media has computer-executable instructions embodied thereon, wherein when executed by a share data allocation (SDA) computing device having at least one processor in communication with a database, the computer-executable instructions cause the SDA computing device to receive, from a plurality of direct-share participants (DSPs), DSP request data indicating an amount of money each DSP is willing to invest in a public offering. The plurality of DSPs are a first set of individual investors identified as eligible for directed shares by an issuer of the public offering. The computer-executable instructions further cause the SDA computing device to receive, from a plurality of interest-based participants (IBPs), IBP request data indicating an amount of money each IBP is willing to invest in the public offering. The plurality of IBPs are a second set of individual investors identified as suitable for the public offering based on past investment activity of the respective IBPs. The computer-executable instructions also cause the SDA computing device to apply a first mapping algorithm to the DSP request data to allocate among the DSPs a first portion of a total amount of assets available to the first and second sets of individual investors, apply a second mapping algorithm, different from the first mapping algorithm, to the IBP request data to allocate among the IBPs a second portion of the total amount of assets available to the first and second sets of individual investors, and receive a notification of the total amount of assets available in the public offering to the first and second sets of individual investors. The computer-executable instructions further cause the SDA computing device to apportion the total amount into the first portion and the second portion, calculate a preliminary allocation of the total amount of assets among the DSPs and the IBPs according to results of the apportionment, the first mapping algorithm, and the second mapping algorithm, and apply a join operator to the preliminary allocation. The join operator adjusts the preliminary allocation to at least one individual investor of the first and second sets of individual investors. The computer-executable instructions further cause the SDA computing device to direct allocation of the total amount of assets among the DSPs and the IBPs according to results of the join operator.

DETAILED DESCRIPTION

Figure 1:
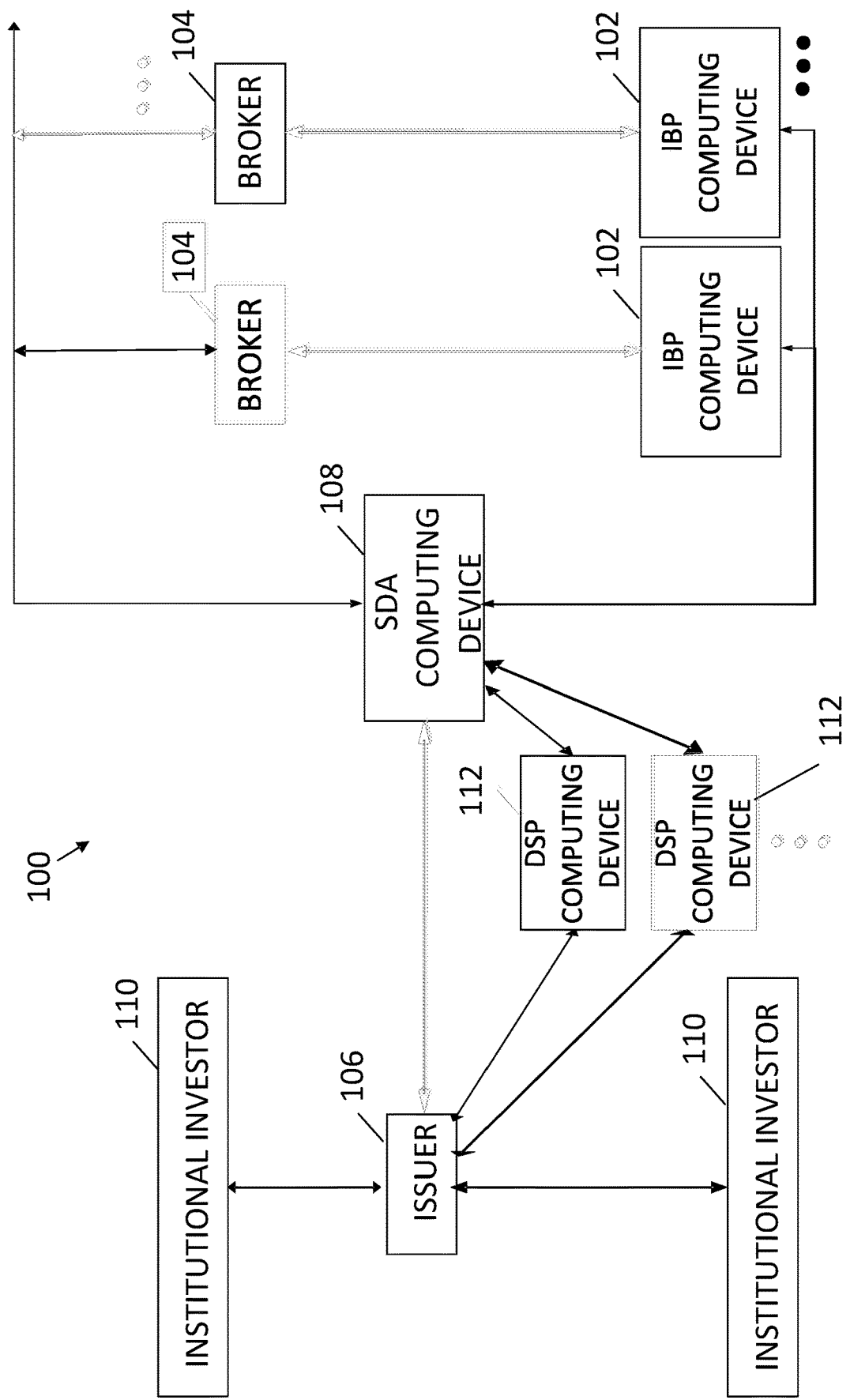
FIG. 1 is a schematic diagram of an example public asset offering illustrating an example share data allocation (SDA) computing device in communication with directed-share participant (DSP) computing devices, interest-based participant (IBP) computing devices, broker-dealer computing devices, and an issuer computing device.

The following detailed description illustrates embodiments of the disclosure by way of example and not by way of limitation. The description enables one skilled in the art to make and use the disclosure, and describes several embodiments, adaptations, variations, alternatives, and uses of the disclosure, including what is presently believed to be the best mode of carrying out the disclosure. The disclosure is described as applied to an example embodiment, namely, systems and methods for allocating assets in a public offering, such as but not limited to an initial public offering (IPO) of shares in a company. The system described herein includes at least one share data allocation (SDA) computing device that allocates assets in a public offering. The SDA computing device may be in communication with at least one broker-dealer computing device, a large number of participant computing devices, and at least one issuer computing device.

In the example embodiment, the SDA computing device is configured to be in communication with at least one directed-share participant (DSP) via at least one DSP computing device, and with at least one interest-based participant (IBP) via at least one IBP computing device. DSPs are potential investors who are identified by an issuer as eligible to request shares of a public offering. DSPs may include, for example, friends and family members of the principals of an issuer company that the company wants to make sure have the opportunity to participate in the public offering. DSPs may request shares by sending a request to the SDA computing device. In some embodiments the SDA computing device is configured to send a notification to at least one DSP computing device, based on input from the issuer, to notify a DSP associated with the DSP computing device of an opportunity to participate in the public offering. In other embodiments, DSPs may not receive a notification for a public offering but are aware, such as via direct contact from the issuer, that they have been designated as DSPs by the issuer, and may be responsible for initiating communications with the SDA computing device, for example by transmitting the request via a designated website or email address. In further embodiments, DSPs may not be aware of their status as being designated a DSP by the issuer until contacted by the SDA computing device and presented with the opportunity to submit a request.

Further, IBPs are potential investors who are not initially identified by the issuer as DSPs, but still have interest in participating in the public offering. In some embodiments, IBPs may be identified by their broker-dealers, or another party, as investors suitable to invest in the public offering based on past investment activity. IBPs are in communication with the SDA computing device via IBP computing devices, in some cases via an intermediary such the respective broker-dealer, and may request shares by sending a request to the SDA computing device. For example, the SDA computing device may provide an embedded frame for a customer website or server application hosted by the broker-dealer, and the IBP computing devices communicate with the SDA computing device via interaction with the embedded frame presented via the broker-dealer computing system.

Upon receipt of DSP requests and IBP requests, the SDA computing device is configured to manage the requests and allocate, among the DSPs and IBPs, an appropriate portion of whatever amount of assets is ultimately made available for individual investors.

DSP requests may be in the form of DSP request data sent from a DSP computing device to the SDA computing device. DSP request data may include for example, an identification of the DSP associated with the DSP request, an amount of shares requested by the DSP, an identifier of the public offering for which the shares are requested, and the time and date the DSP request was sent. The SDA may be configured to verify the identification of the DSP against a list of eligible DSPs provided by the issuer. Similarly, IBP requests may be in the form of IBP request data sent from an IBP computing device to the SDA computing device. IBP request data may include, for example, an identification of the IBP associated with the IBP request, an amount of shares requested by the IBP, an identifier of the public offering for which the shares are requested, and the time and date the IBP request was sent.

When the DSPs and IBPs submit their requests, it is typically unknown how many assets will be allocated by the issuer to satisfy the requests of individual investors. Moreover, the total amount of assets allocated by the issuer for distribution to individual investors rarely is sufficient to satisfy a full amount of every request from the DSPs and IBPs. In other words, the submitted DSP and IBP requests must be modified in such cases based upon a total amount of assets ultimately made available to individual investors in the public offering. The SDA computing device is programmed to allocate the total amount of assets available to individual investors in the offering in a fashion that accommodates the requested amounts of the DSPs and the IBPs, any bias of the issuer to ensure that participation of one or more DSPs is guaranteed or limited to some extent, the relative suitability of each IBP for participation, and any other special circumstances associated with a particular offering, in a predictable, repeatable, and verifiable fashion.

In the example embodiment, the SDA computing device determines a relative standing among the DSPs, a relative standing among the IBPs, and a relative standing between (i) the DSPs as a group, which may be referred to as a first set of individual investors, and (ii) the IBPs as a group, which may be referred to as a second set of individual investors. More specifically, the SDA computing device is configured to apply a first mapping algorithm to the DSP request data to determine the relative standing among the DSPs, which is then used to allocate among the DSPs a first portion of the total amount of assets made available to individual investors that is designated for the DSPs as a group. Further, the SDA computing device is configured to apply a second mapping algorithm to the IBP request data to determine the relative standing among the IBPs, which is then used to allocate among the IBPs a second portion of the total amount of assets made available to the individual investors that is designated for the IBPs as a group. In the example embodiment, because the interests of the issuer are different with respect to the first set of individual investors (DSPs) and the second set of individual investors (IBPs), the first mapping algorithm is different from the second mapping algorithm. Alternatively, an identical mapping algorithm may be used for each set of individual investors.

An example first mapping algorithm may convert each DSP request into a fraction of a sum of the amounts of all of the DSP requests, such that the mapped DSP requests add up to one. For example, if a total of two DSPs transmit DSP request data, a first DSP request is for $50,000, and a second DSP request is for $30,000, the DSP request total is $80,000. A mapping algorithm applied to the DSP request data may map the DSP requests such that the first DSP request is represented as $5/8$ and the second DSP request is represented as $3/8$. Thus, when a total amount of assets available is known, and a first portion of those assets is determined to be allocated to the DSPs as a group, $5/8$ of the first portion of assets to be allocated to the DSPs will be allocated to the first DSP and $3/8$ of the first portion of assets to be allocated to the DSPs will be allocated to the second DSP, even though $5/8$ of the portion of assets and $3/8$ of the portion of assets may be less than the initially requested $50,000 and $30,000 respectively.

Additionally or alternatively, the first mapping algorithm may apply an allocation bias defined by the issuer and/or another party. For example, the issuer may wish to ensure that participation of one or more DSPs is guaranteed or limited to some extent based on a relative amount of contributions or support previously provided by the DSP to the company. In conventional methods for allocating assets in public offerings, such allocation bias must be applied on an ad hoc basis by manually adjusting and re-balancing allocations across the board in order to arrive at an acceptable accommodation, and may result in inadequate documentation or record-keeping of the results and reasoning behind the adjustment. In contrast, embodiments of the current disclosure automatically accommodate allocation bias at the outset of the distribution and apply the bias in a predictable, repeatable, and verifiable fashion, greatly simplifying both the distribution process and regulatory compliance.

In some embodiments the issuer and/or other party may have the opportunity to provide allocation bias data via input throughout the systems and methods as described herein. For example, an issuer may provide allocation bias data in a predetermined format to the SDA computing device by identifying upper and/or lower limits, in either proportional or absolute terms, on the amount of assets that may be allocated to a selected one or more of the DSPs. The allocation bias data may then be applied in conjunction with the DSP request data. As an example, the first mapping algorithm may first convert each DSP request into a fraction of a sum of the amounts of all of the DSP requests, as described above, compare the results against the allocation bias data, and then adjust the allocation to satisfy the allocation bias data. As described above, allocation bias data may be provided by an issuer and/or other party. In some embodiments the SDA computing device may be configured to determine bias data directly from DSP request data.

In the example embodiment, the second mapping algorithm may be based on an investor score for each of the IBPs, as computed by the SDA computing device based on past investment activity of the respective IBP. More specifically, the second mapping algorithm includes a comparison of the investor scores of each IBP. For example, the SDA computing device may further be in communication with at least one data database for storing information, such as historical investor data. The historical investor data may include data fields relating to past investment activity of a plurality of individual investors, including IBPs, conducted through channels external to SDA computing device (e.g., through their associated broker-dealers). For example, such "external" historical investor data may include one or more of: average number of days holding an asset at peak value, average number of days holding an asset of a particular asset classification, percentage of the aftermarket accumulation of a particular asset, number of transactions per year, and/or average size of transaction per buying power at the time of the transaction. For example, these characteristics may be used to score each IBP based on investment behaviors that would tend to benefit the issuer in the public offering.

Historical investor data may also include data relating to previous investment activity with respect to public offerings previously offered through the SDA computing device, referred to as "internal" historical investor data. For example, such internal historical investor data may include one or more of: the fraction of assets actually purchased relative to the amount of assets the investor indicated a willingness to purchase at the candidate stage, the number of days the previous offering was held divided by a threshold number of days, a percentage of social share by the investor, and/or size of the order with respect to buying power. The threshold number of days is selected as a threshold time period for holding the assets that is associated with stability of the asset price after the offering. The percentage of social share by the investor is a percentage of offerings previously offered to the investor through the SDA computing device for which the investor has electronically shared information regarding the offering (e.g., by sharing that the investor has made an investment via a social media platform). These characteristics likewise may be used to score each IBP based on investment behaviors that would tend to benefit the issuer in the public offering. After the investor scores are computed according to a suitable algorithm, the second mapping algorithm may sum the investor scores of all IBPs, and assign a respective fraction of the total IBP assets to each IBP in proportion to the investor score of the IBP divided by the sum of all investor scores. If it transpires that the amount of requested assets in the IBP request data corresponding to a particular IBP is less than the proportional amount mapped to the IBP based on the investor score of the respective IBP, the amount allocated to the particular IBP may be adjusted downward and the remaining total IBP assets re-mapped according to the proportional investor scores.

In the example embodiment, the SDA computing device is further configured to receive a notification of the total amount of assets available to individual investors in the public offering, and apportion the total amount of assets available into a first portion, to be made available to a first set of investors (e.g., DSPs), and a second portion, to be made available to a second set of investors (e.g., IBPs). The amount of assets apportioned to the first portion and second portion may be determined, at least in part, by issuer input. For example an issuer may define a specific amount of assets to be apportioned to the first portion and/or the second portion. In other embodiments the apportioned amounts may be determined by the DSP and IBP requests themselves. For example, the SDA computing device may compare a sum of the amount of money the DSPs as a group are willing to invest in the public offering against a sum of the amount of money the IBPs as a group are willing to invest in the public offering, and determine the first and second portions in corresponding proportion. Thus, if IBPs as a group request more than DSPs, the amount of assets apportioned to the IBPs will be greater than the amount of assets apportioned to the DSPs. Alternatively, the SDA computing device may apportion the total assets made available to individual investors between the first and second sets of individual investors in any suitable fashion.

After apportioning the total amount of assets into a first portion and second portion, the SDA computing device is configured to calculate a preliminary allocation of the total amount of assets among the DSPs and the IBPs according to the apportionment described above, and the first and second mapping algorithms. Continuing from the earlier example, if a portion of assets allocated to DSPs is $40,000, DSPs allocated ⅝ and ⅜, as a result of their DSP requests and the example first mapping algorithm, would be allocated $25,000 and $15,000 respectively.

After preliminary allocations are calculated for each group of investors, such as the DSPs and IBPs, the SDA computing device is configured to join the allocations into a final dataset, and allocate the determined portions of shares to the respective investors. In some embodiments, a join operator may be used to adjust the preliminary allocation of assets before the assets are finally allocated. This provides for customization of the allocation of shares after a preliminary allocation is determined by the SDA computing device. The issuer may be able to pre-select the join operator to include a number of pre-defined constraints. For example, the join operator may configured to establish a floor for the first portion of assets (i.e., the total for allocation among the DSPs), for example at a threshold percentage of a sum of the amount of money the DSPs as a whole are willing to invest in the public offering. Additionally or alternatively, the join operator may be configured to cap the first portion at a threshold amount, thereby establishing an upper bound for allocations to the DSPs as a group. Similar join operator characteristics may be applied to the IBPs.

Additionally or alternatively, the join operator may be customizable upon review of the preliminary allocation by the issuer. For example, after reviewing a preliminary allocation, an issuer may desire to increase the allocations to particular DSPs at the expense of the IBPs as a group. Based on input received from the issuer regarding the increase to the specified DSPs, the join operator is configured to calculate a corresponding reduction in the portion of assets available to the IBPs as a group, and re-apply the results of the second mapping based on the reduction. Again, embodiments of the current disclosure automatically accommodate special circumstances at the appropriate point in the distribution process, and re-balance the allocation across the board in a predictable, repeatable, and verifiable fashion, greatly simplifying both the distribution process and regulatory compliance. Thus, the assets will not be directed to the DSPs and IBPs until the issuer, in this example, has a chance to review and/or modify the asset allocations.

In certain embodiments, the SDA computing device may be configured to apply the systems and methods described herein to any number of participants, not limited to the DSPs and IBPs as described in an example embodiment. For example, a third and/or fourth group of investors may request shares, and be apportioned an amount of shares by the SDA computing device in accordance with the systems and methods described herein.

The technical problems addressed by the disclosure include at least one of: (i) inability of computing devices to unify two or more models for allocation of a corpus of assets, wherein the two or more models represent different interests in two or more groups eligible to participate in the offering; (ii) inability of computing devices to account for bias with respect to certain individuals in one of the groups when unifying and applying the two or more models; and (iii) inability of computing devices to account for case-specific circumstances during the process of unifying and applying two or more models being used for allocation of the same assets.

The technical effects achieved by the systems and methods described herein include at least one of: (i) receiving, from a plurality of direct-share participants (DSPs), DSP request data indicating an amount of money each DSP is willing to invest in a public offering wherein the plurality of DSPs are a first set of individual investors identified as eligible for directed shares by an issuer of the public offering; (ii) receiving, from a plurality of interest-based participants (IBPs), IBP request data indicating an amount of money each IBP is willing to invest in the public offering wherein the plurality of IBPs are a second set of individual investors identified as suitable for the public offering based on past investment activity of the respective IBPs; (iii) applying a first mapping algorithm to the DSP request data to allocate among the DSPs a first portion of a total amount of assets available to the first and second sets of individual investors; (iv) applying a second mapping algorithm, different from the first mapping algorithm, to the IBP request data to allocate among the IBPs a second portion of the total amount of assets available to the first and second sets of individual investors; (v) receiving a notification of the total amount of assets available in the public offering to the first and second sets of individual investors; (vi) apportioning the total amount into the first portion and the second portion; (vii) calculating a preliminary allocation of the total amount of assets among the DSPs and the IBPs according to results of the apportionment, the first mapping algorithm, and the second mapping algorithm; (viii) applying a join operator to the preliminary allocation, wherein the join operator adjusts the preliminary allocation to at least one individual investor of the first and second sets of individual investors; and (ix) directing allocation of the total amount of assets among the DSPs and the IBPs according to results of the join operator.

The resulting technical benefits achieved by the systems and methods of the disclosure include at least one of: (i) ability to unify two or more mapping models being used for allocation of the same pool of assets to groups having different interests; (ii) ability to account for bias with respect to certain individuals when unifying and applying two or more models being used for allocation of the same pool of assets; and (iii) ability to re-balance a preliminary allocation in response to special circumstances, either pre-selected or identified upon review of the preliminary allocation, while maintaining the applicability of the two or more models being used for allocation of the same assets.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS® is a registered trademark of Cisco Systems, Inc. located in San Jose, CA). In yet a further embodiment, the system is run on a Mac OS® environment (Mac OS® is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle® is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram of an example public asset offering environment 100, illustrating an example share data allocation (SDA) computing device 108 in communication with DSP computing devices 112, IBP computing devices 102, broker-dealer computing devices 104, and an issuer computing device 106.

Each DSP computing device 112 is associated with a directed-shares participant (DSP) investor in environment 100. Each DSP may be an individual who has a previously existing relationship with an issuer associated with issuer computing device 106, and the issuer may wish to provide a specific opportunity to the DSP to purchase stock in the issuer's initial public offering on the basis of the relationship. For example, the DSP may be a friend or relative of a principal of the issuer. In some embodiments, issuer computing device 106 transmits contact information of the DSP to SDA computing device 108, and SDA computing device 108 is configured to transmit a notification to DSP computing device 112, based on the contact information, to notify the DSP associated with DSP computing device 112 of the steps to be performed to participate in the public offering. For example, the notification includes a link to a web page associated with SDA computing device 108 and accessible to DSP computing device 112, or a download link for a client application installable on DSP computing device 112 to enable communication with a server application associated with SDA computing device 108. In other embodiments, issuer computing device 106 transmits the notification to DSP computing device 112 to notify the DSP associated with DSP computing device 112 of the steps to be performed to participate in the public offering. For example, the notification from issuer computing device 106 includes the link to the web page associated with SDA computing device 108 or the download link for the client application to enable communication with the server application associated with SDA computing device 108. In the example embodiment, environment 100 may include a plurality of DSP computing devices 112 each associated with an individual DSP who has a previously existing relationship with the issuer. Although the number of DSPs in a given public offering is typically limited to a relatively small number of individuals, the disclosure contemplates an essentially unlimited number of DSP computing devices 112.

Because DSP computing devices 112 are each associated with a DSP who is identified by the issuer as a DSP, DSPs in the example embodiment do not need to be in communication with a broker-dealer in order to learn of and/or participate in the public offering. Accordingly, in the example embodiment, DSP computing devices 112 are not illustrated in communication with one of broker-dealer computing devices 104. However, in alternative examples, at least one DSP computing device 112 is additionally in communication with one of broker-dealer computing devices 104 and may communicate with SDA computing device 108 via broker-dealer computing device 104.

Each IBP computing device 102 is associated with an interest-based participant (IBP) investor in environment 100. Each IBP may be an individual who is interested generally in purchasing assets through public offerings. For example, the IBP may wish to purchase stock in any corporation having a suitable initial public offering. Each IBP may have associated historical investor data 212 (shown in FIG. 2) corresponding to the investor's historical involvement in IPOs and other public offerings. Each IBP computing device 102 is in communication with SDA computing device 108. For example, each individual investor registers with a service provided by SDA computing device 108. In response to the registration, SDA computing device 108 transmits notifications of upcoming public asset offerings to IBP computing device 102. For example, but not by way of limitation, SDA computing device 108 transmits notifications to IBP computing device 102 via a client application installed on IBP computing device 102, or via a web page accessible to IBP computing device 102 in response to IBP computing device 102 transmitting log-in credentials to the web server. As shown in FIG. 1, in the example embodiment, environment 100 may include a plurality of IBP computing devices 102 each associated with an individual investor. Some embodiments include offers transmitted to hundreds, thousands, tens of thousands, or millions of IBP computing devices 102. IBP computing devices 102 may be in direct communication with SDA computing device 108, or in indirect communication with SDA computing device 108 via a broker-dealer computing device 104 of a broker-dealer with which the IBP has an account.

Each broker-dealer computing device 104 is associated with a corresponding broker-dealer in environment 100. The broker-dealer is an individual or organization that engages in the business of trading securities (e.g., stock) on behalf of the broker-dealer's customers (e.g., individual investors). Broker-dealer computing device 104 may store or generate historical investor data corresponding to investment activity of individual investors through the broker-dealer corresponding to broker-dealer computing device 104. Each broker-dealer computing device 104 is in direct communication with SDA computing device 108 and with IBP computing devices 102 of each customer/IBP of the broker-dealer. Broker-dealer computing device 104 transmits historical investor data accumulated by broker-dealer computing device 104 to SDA computing device 108.

Issuer computing device 106 is associated with an issuer of a public offering such as an IPO. The issuer sells, for example, shares of stock in a corporation in exchange for funds. The issuer may generally select investors in the public offering based on, for example, a perceived financial capability and expected future investing behavior. As such, the issuer may be in communication with any number of institutional investors 110 and may allocate any suitable portion of the offering to institutional investors 110 outside the channels provided by SDA computing device 108. Additionally or alternatively, the issuer may consider allocating a portion of the offering to DSPs and/or IBPs via SDA computing device 108. The issuer may consider the investors in environment 100 in aggregate, such that the issuer's decision on how much of the offering to allocate DSPs, and IBPs, rather than solely to institutional investors, may be based on the aggregate perceived financial capability and expected future investing behavior of all the individual investors in environment 100. In some embodiments the issuer may consider investors in environment 100 in groups for allocation purposes. For example the issuer may consider DSPs as a first set of individual investors, and IBPs as a second set of individual investors. While one issuer computing device 106 is shown in FIG. 1, environment 100 may include a plurality of issuer computing devices 106 each associated with a corresponding issuer.

SDA computing device 108 is further in communication with at least one database 218 (shown in FIG. 2, and implemented for example by storage device 425 shown in FIG. 4) for storing information, such as historical investor data 212. In the example embodiment, historical investor data 212 is stored in at least one data structure having a plurality of data fields and a plurality of records, each record including a plurality of data values corresponding to the plurality of data fields. Historical investor data 212 may include data fields relating to past investment activity of the plurality of individual investors executed through channels external to SDA computing device 108. In the example embodiment, the external historical investor data may be received from one or more of the broker-dealer computing devices 104 in communication with SDA computing device 108. For example, the external historical investor data fields may include one or more of: average number of days holding an asset at peak value, average number of days holding an asset of a particular asset classification, percentage of the aftermarket accumulation of a particular asset, number of transactions per year, and/or average size of transaction per buying power at the time of the transaction.

Historical investor data may also include data relating to previous investment activity with respect to public offerings through SDA computing device 108, referred to as "internal" historical investor data. In some embodiments, SDA computing device 108 is configured to capture data from previous investment activity of the plurality of individual investors conducted through SDA computing device 108, and store the captured data as at least a portion of the historical investor data in the database. For example, the internal historical investor data fields may include one or more of: the fraction of assets actually purchased relative to the amount of assets the investor indicated a willingness to purchase at the candidate stage, the number of days the previous offering was held divided by the threshold number of days, percentage of social share by the investor, and/or size of the order with respect to buying power. As discussed above, the percentage of social share by the investor is a percentage of offerings previously offered to the investor through SDA computing device 108 for which the investor has electronically shared information regarding the offering (e.g., by sharing that the investor has made an investment via a social media platform). In some embodiments, such sharing over electronic social media platforms by candidate individual investors is a behavior that the issuer and/or corporation offering the asset wish to encourage in order to build positive momentum for the offering.

In the example, SDA computing device 108 utilizes the historical investor data to compute an investor score for each of the plurality of IBPs. The investor score may be dynamic, in that it is at times re-computed to include additional data, such as newly available data that is added to the historical investor data in the database. For example, the investor score may be re-computed periodically (e.g., every 12 hours) or re-computed after the completion of each asset offering of which IBP computing device 102 receives notification from SDA computing device 108. The investor score may be calculated based on a variety of different data fields in the historical investor data, such as but not limited to the average number of days holding an asset at peak value, the average number of days holding an asset of a particular asset classification, the percentage of the aftermarket accumulation of a particular asset, the number of transactions per year, and the average size of the transaction per buying power at the time of the transaction, obtained from investment transactions executed external to SDA device 108, such as via broker-dealer computing device 104. In other words, these records represent investing activity of IBPs with the broker-dealer outside of offerings made through SDA computing device 108. The investor score may further be calculated based on other data fields, such as the fraction of assets actually purchased relative to the amount of assets the investor indicated a willingness to purchase at the candidate stage, percentage of social share by the investor, and/or size of the order with respect to buying power, generated internally within SDA computing device 108 based on past activity of the candidate IBP with SDA computing device 108.

Figure 2:
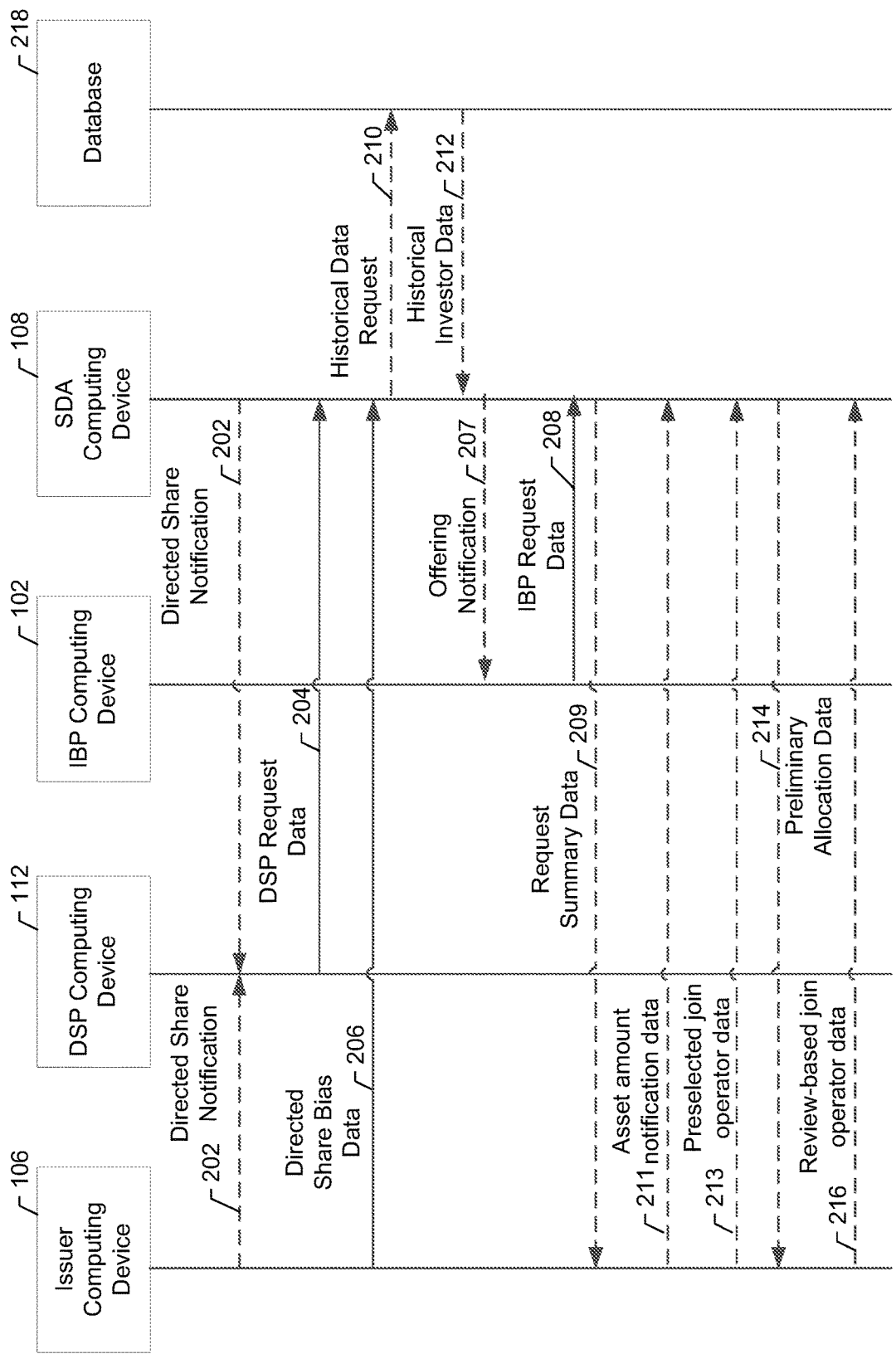
FIG. 2 is an example data flow diagram illustrating allocation of assets to DSPs and IBPs using the SDA computing device shown in FIG. 1.

FIG. 2 is an example data flow diagram illustrating allocation of assets implemented using SDA computing device 108. In some embodiments SDA computing device 108 may be configured to send a directed share notification 202 to at least one DSP computing device 112 to notify a DSP associated with the DSP computing device 112 of the DSP's opportunity to participate in the public offering. For example, the directed share notification 202 includes a link to a web page associated with SDA computing device 108 and accessible to DSP computing device 112, or a download link for a client application installable on DSP computing device 112 to enable communication with a server application associated with SDA computing device 108. DSP computing devices 112 then uses the information in directed share notification 202 to establish communication with SDA computing device 108. Alternatively, issuer computing device 106 may be configured to send the directed share notification 202 to at least one DSP computing device 112. In other embodiments, DSPs may not receive directed share notification 202, but are otherwise informed that they have been designated as DSPs by the issuer, and may be responsible for initiating communications with the SDA computing device in any suitable fashion, for example by sending an email including DSP request data 204 to an email address provided by the issuer.

DSP requests may be transmitted in the form of DSP request data 204 from DSP computing device 112 to SDA computing device 108. DSP request data 204 may include for example, an identification of the DSP associated with the DSP request, an amount of shares requested by the DSP, an identifier of the public offering for which the shares are requested, and the time and date the DSP request was sent.

Similarly, IBPs may request shares in the form of IBP request data 208 sent from IBP computing device 102 to SDA computing device 108. In some embodiments, IBP request data 208 is transmitted from IBP computing device 102 to broker-dealer computing device 104, and then to SDA computing device 108. IBP request data 208 may include, for example, an identification of the IBP associated with the IBP request, an amount of shares requested by the IBP, an identifier of the public offering for which the shares are requested, and the time and date the IBP request was sent.

In some embodiments IBP computing device 102 transmits IBP request data 208 in response to an offering notification 207 transmitted by SDA computing device 108. For example, the IBP previously registered IBP computing device 102 with a service provided by SDA computing device 108, and in response SDA computing device 108 transmits offering notifications 207 for a number of upcoming public asset offerings to IBP computing device 102. After reviewing each notification 207, the IBP selects offerings of interest and transmits IBP request data 208 for each selected offering. In some such embodiments, SDA computing device 108 selects registered IBPs to whom to send offering notification 207 for a particular offering based on an investor score calculated using historical investor data 212 obtained by sending a historical data request 210 to database 218, as described further below. Alternatively, offering notification 207 is sent to IBP computing devices 102 based on any suitable criteria.

Upon receipt of DSP requests 204 and IBP requests 208, SDA computing device 108 is configured to manage the requests and allocate, among the DSPs and IBPs, an appropriate portion of whatever amount of assets is ultimately made available for individual investors.

In the example embodiment, SDA computing device 108 is configured to apply a first mapping algorithm to DSP request data 204 to determine a relative standing among the DSPs, which is then used to allocate among the DSPs a first portion of the total amount of assets made available to individual investors that is designated for the DSPs as a group. Further, SDA computing device 108 is configured to apply a second mapping algorithm to IBP request data 208 to determine a relative standing among the IBPs, which is then used to allocate among the IBPs a second portion of the total amount of assets made available to the individual investors that is designated for the IBPs as a group. In the example embodiment, because the interests of the issuer are different with respect to the first set of individual investors (DSPs) and the second set of individual investors (IBPs), the first mapping algorithm is different from the second mapping algorithm. Alternatively, an identical mapping algorithm may be used for each set of individual investors.

An example first mapping algorithm may convert each DSP request into a fraction of a sum of the amounts of all of the DSP requests, such that the mapped DSP requests add up to one. For example, if a total of two DSPs transmit DSP request data 204, a first DSP request is for $50,000, and a second DSP request is for $30,000, the DSP request total is $80,000. A mapping algorithm applied to the DSP request data 204 may map the DSP requests such that the first DSP request is represented as ⅝ and the second DSP request is represented as ⅜. Thus, when a total amount of assets available is known, and a first portion of those assets is determined to be allocated to the DSPs as a group, ⅝ of the first portion of assets to be allocated to the DSPs will be allocated to the first DSP and ⅜ of the first portion of assets to be allocated to the DSPs will be allocated to the second DSP, even though ⅝ of the portion of assets and ⅜ of the portion of assets may be less than the initially requested $50,000 and $30,000 respectively.

Additionally or alternatively, the first mapping algorithm may apply an allocation bias defined by the issuer and sent from issuer computing device 106 to SDA computing device 108 as directed share bias data 206. For example, the issuer may wish to ensure that participation of one or more DSPs is guaranteed or limited to some extent based on a relative amount of contributions or support previously provided by the DSP to the company. Alternatively, directed share bias data 206 is sent by another suitable party In conventional offerings, such allocation bias must be applied on an ad hoc basis, as discussed above, and may result in inadequate documentation or record-keeping of the results and reasoning behind the adjustment. In contrast, embodiments of the current disclosure automatically accommodate allocation bias at the outset of the distribution, in accordance with directed share bias data 206, and apply the bias in a predictable, repeatable, and verifiable fashion, greatly simplifying both the distribution process and regulatory compliance. As noted above, examples of directed share bias data 206 may include upper and/or lower limits, in either proportional or absolute terms, on the amount of assets that may be allocated to a selected one or more of the DSPs. Alternatively, any suitable directed share bias data 206 may be provided.

The first mapping algorithm may apply the directed share bias data 206 in conjunction with DSP request data 204. As an example, the first mapping algorithm may first convert DSP request data 204 into a fraction of a sum of the amounts of all of the DSP request data 204, as described above, compare the results against the directed share bias data 206, and then adjust the allocation mapped to each DSP to satisfy the directed share bias data 206. In some embodiments SDA computing device 108 may be configured to determine directed share bias data 206 directly from DSP request data 204, for example by matching DSP identification data included in DSP request data 204 against criteria previously supplied by issuer computing device 106.

In the example embodiment, the second mapping algorithm may be based on an investor score for each of the IBPs, computed by SDA computing device 108 based on past investment activity of the respective IBP. More specifically, the second mapping algorithm includes a comparison of the investor scores of each IBP. For example, SDA computing device 108 may further be in communication with at least one data database 218 for storing information, such as historical investor data 212, and may request historical investor data 212 by sending a historical data request 210 to database 218. Historical investor data 212 may include data fields relating to past investment activity of a plurality of individual investors, including IBPs, conducted through channels external to SDA computing device 108 (e.g., through their associated broker-dealers). For example, such "external" historical investor data may include one or more of: average number of days holding an asset at peak value, average number of days holding an asset of a particular asset classification, percentage of the aftermarket accumulation of a particular asset, number of transactions per year, and/or average size of transaction per buying power at the time of the transaction.

Historical investor data 212 may also include data relating to previous investment activity with respect to public offerings previously offered through SDA computing device 108, referred to as "internal" historical investor data. For example, such internal historical investor data may include one or more of: the fraction of assets actually purchased relative to the amount of assets the investor indicated a willingness to purchase at the candidate stage, the number of days the previous offering was held divided by a threshold number of days, a percentage of social share by the investor, and/or size of the order with respect to buying power. The threshold number of days is selected as a threshold time period for holding the assets that is associated with stability of the asset price after the offering. The percentage of social share by the investor is a percentage of offerings previously offered to the investor through SDA computing device 108 for which the investor has electronically shared information regarding the offering (e.g., by sharing that the investor has made an investment via a social media platform).

Alternatively, the data used to calculate the investor scores is obtained by SDA computing device 108 in any suitable fashion. Alternatively, in some embodiments, investor scores may be computed by another computing device, and stored in database 218 for retrieval by SDA computing device 108 or otherwise provided to SDA computing device 108.

After SDA computing device 108 computes the investor scores according to a suitable algorithm, the second mapping algorithm may sum the investor scores of all IBPs, and assign a respective fraction of the total IBP assets to each IBP in proportion to the investor score of the IBP divided by the sum of all investor scores. If it transpires that the amount of requested assets in the IBP request data 208 corresponding to a particular IBP is less than the proportional amount mapped to the IBP based on the investor score of the respective IBP, the amount allocated to the particular IBP may be adjusted downward to match the amount submitted in the IBP request data 208, and the remaining total IBP assets re-mapped to the remaining IBPs according to their proportional investor scores. Alternatively, the second mapping algorithm may assign a respective fraction of the total IBP assets to each IBP in proportion to a weighted combination of the amount of requested assets in the corresponding IBP request data 208 and the investor score of the respective IBP. For example, the second mapping algorithm may ensure that IBPs evidencing the most suitable investment behavior receive the full amount submitted in the corresponding IBP request data 208, while other IBPs receive only a fraction of the amount submitted in the corresponding IBP request data 208.

In the example embodiment, SDA computing device 108 is further configured to receive asset amount notification data 211 from issuer computing device 106, identifying the total amount of assets available to individual investors (that is, both DSPs and IBPs) in the public offering. Alternatively, SDA computing device 108 receives asset amount notification data 211 from any suitable source. In some embodiments, SDA computing device 108 first transmits request summary data 209 to issuer computing device 106, providing the issuer with details about the characteristics of, and/or amounts of assets requested by, DSPs and IBPs, and issuer computing device 106 weighs the request summary data 209 in determining the total amount of assets to be distributed to individual investors, as compared to the amounts allocated to institutional investors 110 (shown in FIG. 1). For example, if all the IBPs have relatively high investor scores, the issuer may decide to allocate a correspondingly larger portion of assets to individual investors. Additionally or alternatively, issuer computing device 106 determines the total amount of assets available to individual investors in any suitable fashion.

SDA computing device 108 is further configured to apportion the total amount of assets available into a first portion, to be made available to a first set of investors (e.g., DSPs), and a second portion, to be made available to a second set of investors (e.g., IBPs). The amount of assets apportioned to the first portion and second portion may be determined, at least in part, by issuer input. For example, asset amount notification data 211 may expressly include a specific amount of assets to be apportioned to the first portion (DSPs) and/or the second portion (IBPs). In other embodiments, the apportioning may be determined by the DSP request data 204 and IBP request data 208. For example, SDA computing device 108 may compare a sum of the amount of money the DSPs as a group are willing to invest in the public offering and a sum of the amount of money the IBPs as a group are willing to invest in the public offering, and determine the first and second portions in corresponding proportion. Thus, if IBPs request more than DSPs, the amount of assets apportioned to the IBPs may be greater than the amount of assets apportioned to the DSPs. Alternatively, SDA computing device 108 may apportion the total assets made available to individual investors between the first and second sets of investors in any suitable fashion.

After apportioning the total amount of assets into a first portion and second portion, SDA computing device 108 is configured to calculate a preliminary allocation of the total amount of assets among the DSPs and the IBPs according to the apportionment described above, and the first and second mapping algorithms. Continuing from the earlier example, if a portion of assets allocated to DSPs is $40,000, DSPs allocated ⅝ and ⅜, as a result of their DSP requests and the example first mapping algorithm, would be allocated $25,000 and $15,000 respectively. After allocations are made to each group of investors, such as the DSPs as determined by the first mapping algorithm and the IBPs as determined by the second mapping algorithm, SDA computing device 108 is configured to join the allocations into a final dataset, and allocate the determined portions of shares to the respective investors.

In some embodiments, a join operator may be used to adjust the preliminary allocation of assets before the assets are finally allocated. This provides for customization of the allocation of shares after a preliminary allocation is determined by the SDA computing device. In some embodiments, issuer computing device 106 transmits pre-selected join operator data 213 including a number of pre-defined constraints to be applied to the preliminary allocation. For example, the pre-selected join operator data 213 may configured to establish a floor for the first portion of assets (i.e., the total for allocation among the DSPs), for example at a threshold percentage of a sum of the amount of money the DSPs as a whole are willing to invest in the public offering. Accordingly, the pre-selected join operator data 213 may extract assets from the pool available to the IBPs if necessary to ensure that the DSPs receive a minimum percentage of their requests. Additionally or alternatively, the join operator may be configured to cap the first portion at a threshold amount, thereby establishing an upper bound for allocations to the DSPs as a group as compared to allocations to IBPs selected based on positive past investment behavior. Pre-selected join operator data 213 may include similar types of join operator characteristics to be applied to the IBPs.

Additionally or alternatively, the join operator may be customizable upon review of the preliminary allocation by the issuer. For example, SDA computing device 108 may be configured to send preliminary allocation data 214 to issuer computing device 106 so that the issuer can review the results of the preliminary allocation, including any adjustments associated with pre-selected join operator data 213. After reviewing preliminary allocation data 214, an issuer in a specific case may desire, for example, to increase the allocations to particular DSPs, at the expense of the IBPs as a group. Issuer computing device 106 transmits corresponding review-based join operator data 216 identifying the adjustment amounts to be applied to individual investors. Based on review-based join operator data 216, SDA computing device 108 is configured to apply the selected individual increases, calculate a corresponding reduction in the portion of assets available to the IBPs as a group, and automatically re-apply the results of the second mapping algorithm to the IBPs based on the reduced amount. Thus, embodiments of the current disclosure automatically accommodate special circumstances at the appropriate point in the distribution process, and re-balance the allocation as necessary across the board in a predictable, repeatable, and verifiable fashion, greatly simplifying both the distribution process and regulatory compliance.

Although the example above includes the issuer applying the increase to one or more DPSs at the expense of the IBPs as a group, alternatively issuer computing device 106 may specify that the increases to one or more DSPs come at the expense of the remaining DSPs as a group. In that case, SDA computing device 108 is further configured to apply the selected individual increases, calculate a corresponding reduction in the portion of assets available to the remaining DSPs as a group, automatically re-apply the first mapping algorithm to the remaining DSPs (excluding the one or more DSPs whose amounts were manually adjusted in review-based join operator data 216), and allocate the remaining reduced portion of assets to the remaining DSPs according to the results of the re-applied first mapping algorithm.

Moreover, in addition to review-based join operator data 216 including an increase to a specified one or more DSPs as in the examples above, a similar procedure is applicable for review-based join operator data 216 including a decrease to one or more specified DSPs, any similar adjustments to IBPs, or group-based adjustments. In cases where issuer computing device 106 does not submit review-based join operator data 216 or review-based join operator data 216 is an empty set, SDA computing device 108 is configured to maintain preliminary allocation data 214 as the final allocation scheme for the DSPs and IBPs.

In alternative embodiments, SDA computing device 108 is not configured to transmit preliminary allocation data 214 to issuer computing device 106 and/or to receive review-based join operator data 216 from issuer computing device 106.

Figure 3:
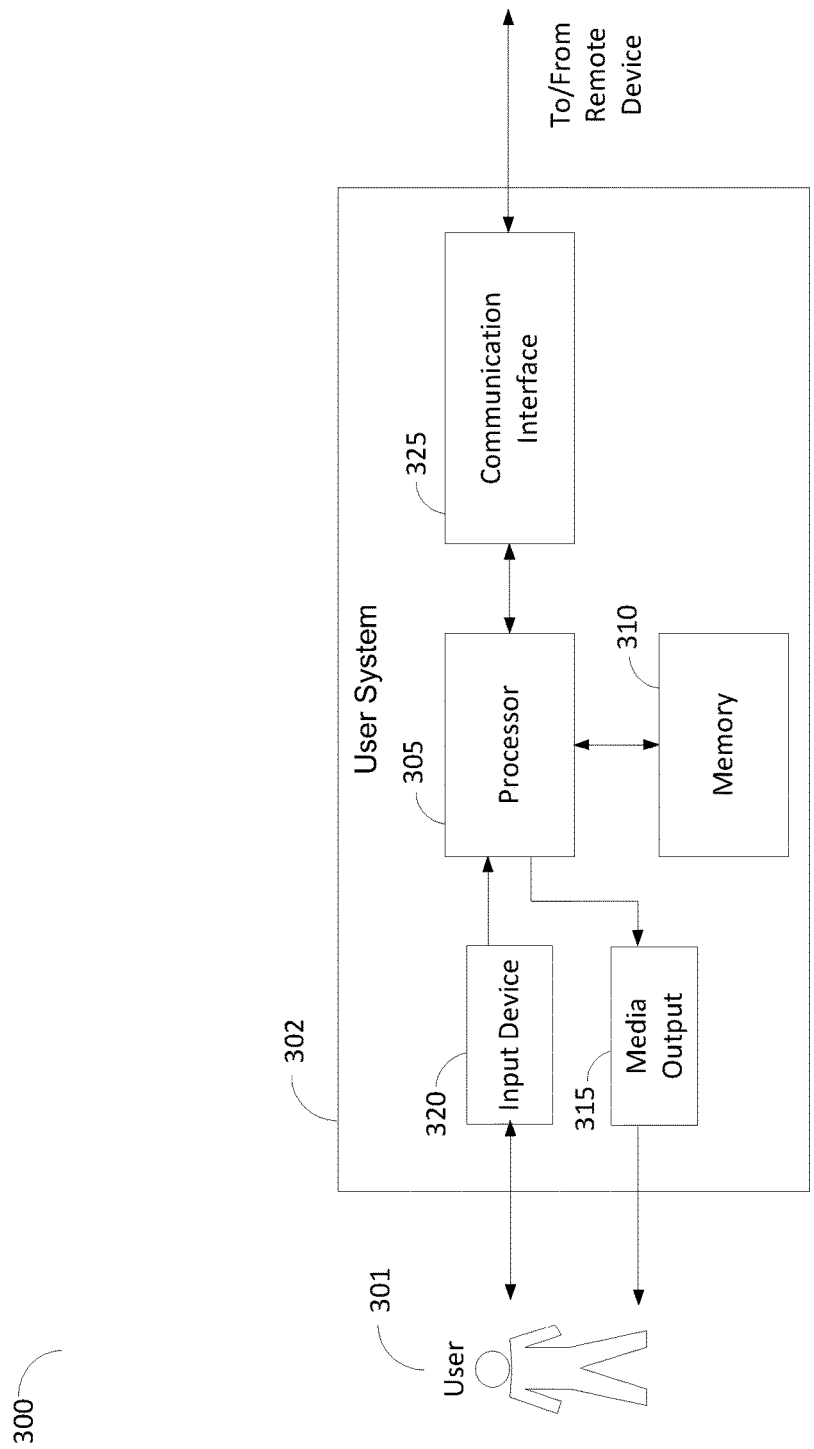
FIG. 3 is an example configuration of a client system that may be used to implement the DSP computing devices, IBP computing devices, broker-dealer computing device, and/or issuer computing device shown in FIG. 1 in accordance with an embodiment of the present disclosure.

After application of the join operator based on pre-selected join operator data 213 and/or review-based join operator data 216, SDA computing device 108 directs allocation of the total amount of assets designated for individual investors among the DSPs and the IBPs according to results of the join operator FIG. 3 is an example configuration of a client system 302 that may be used to implement DSP computing devices 112, IBP computing devices 102, and/or issuer computing device 106 in accordance with embodiments of the present disclosure. In further embodiments client system 302 may also be used to implement a broker-dealer computing device 104. In the example embodiment, client system 302 is operable by a user 301, such as an IBP, a DSP, a broker-dealer, or an issuer. Client system 302 includes a processor 305 for executing instructions stored in a memory area 310. Processor 305 may, for example, include one or more processing units (e.g., in a multi-core configuration). Memory area 310 may, for example, be any device allowing information such as executable instructions and/or investor data to be stored and retrieved. Memory area 310 may further include one or more computer readable media, and/or database 218.

In the example embodiment, client system 302 further includes at least one media output component 315 for presenting information to user 301. Media output component 315 may, for example, be any component capable of converting and conveying electronic information to user 301. For example, media output component 315 may be a display component configured to display component lifecycle data in the form of reports, dashboards, communications, and the like In some embodiments, media output component 315 includes an output adapter (not shown), such as a video adapter and/or an audio adapter, which is operatively coupled to processor 305 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or at least one client application, to user 301. The graphical user interface may include, for example, an interface for viewing and/or responding to offers or other information presented through SDA computing device 108. In some embodiments, client system 302 includes an input device 320 for receiving input from user 301. User 301 may use input device 320 to, without limitation, select offers and/or enter a share and/or purchase request, enter pre-selected join operator data 213 and/or review-based join operator data 216, access log-in credential information, and/or submit payment information. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component such as a touch screen may function as both an output device of media output component 315 and input device 320. Client system 302 may also include a communication interface 325, which is communicatively connectable to a remote device such as broker-dealer computing device 104 and/or SDA computing device 108 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer readable instructions for providing a user interface to user 301 via media output component 315 and, optionally, receiving and processing input from input device 320. A user interface may include, among other possibilities, a web browser, and at least one client application. Web browsers enable users, such as user 301, to display and interact with media and other information typically embedded on a web page or a website from SDA computing device 108. A client application allows user 301 to interact with a server application from SDA computing device 108. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
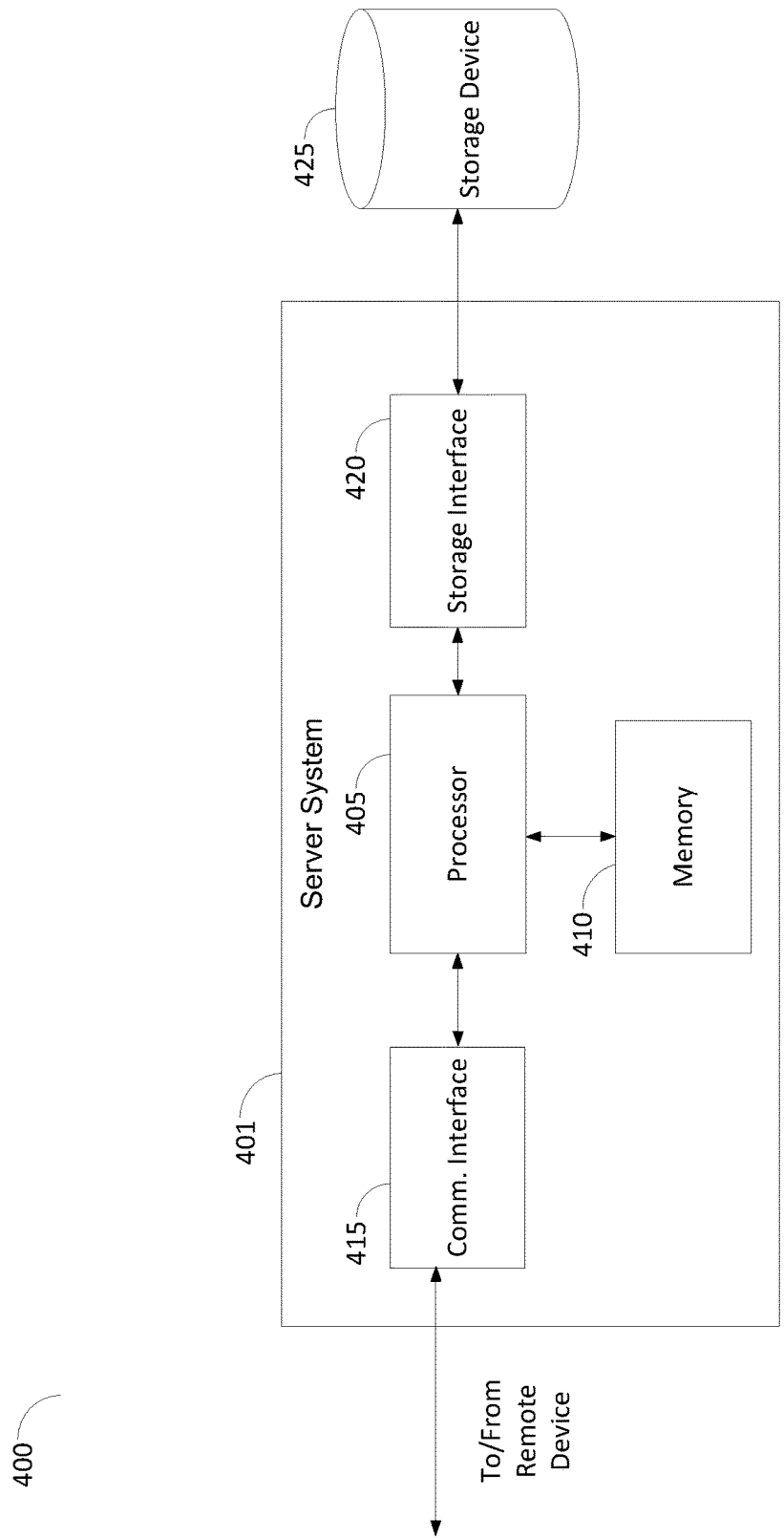
FIG. 4 is an example configuration of a server system that may be used to implement the SDA computing device shown in FIG. 1 in accordance with an embodiment of the present disclosure.

FIG. 4 illustrates an example configuration of a server system 400 that may be used to implement SDA computing device 108 (shown in FIG. 1). In the example embodiment, server system 400 includes at least one server computing device 401, in electronic communication with at least one storage device 425. In the exemplary embodiment, server computing device 401 includes a processor 405 for executing instructions (not shown) stored in a memory area 410. In an embodiment, processor 405 may include one or more processing units (e.g., in a multi-core configuration) for executing instructions. The instructions may be executed within various different operating systems on the server system 400, such as UNIX®, LINUX® (LINUX is a registered trademark of Linus Torvalds), Microsoft Windows®, etc. More specifically, the instructions may cause various data manipulations on data stored in storage device 425 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, JSDA, or other suitable programming languages, etc.).

In the example embodiment, processor 405 is operatively coupled to a communication interface 415 such that server system 400 is capable of communicating with a remote device such as DSP computing device 112, IBP computing device 102, issuer computing device 106, another SDA computing device 108, and/or broker-dealer computing device 104. For example, communication interface 415 may receive requests from remote devices via the Internet.

In the example embodiment, processor 405 is also operatively coupled to a storage device 425, which may be, for example, any computer-operated hardware unit suitable for storing and/or retrieving data. Storage device 425 is used, for example, to store database 218 including historical investor data and/or investor scores. In some embodiments, storage device 425 is integrated in server system 400. For example, server system 400 may include one or more hard disk drives as storage device 425. In other embodiments, storage device 425 is external to server system 400 and may be accessed by a plurality of server systems 400. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 may include, for example, a component capable of providing processor 405 with access to storage device 425. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 405 with access to storage device 425.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 5:
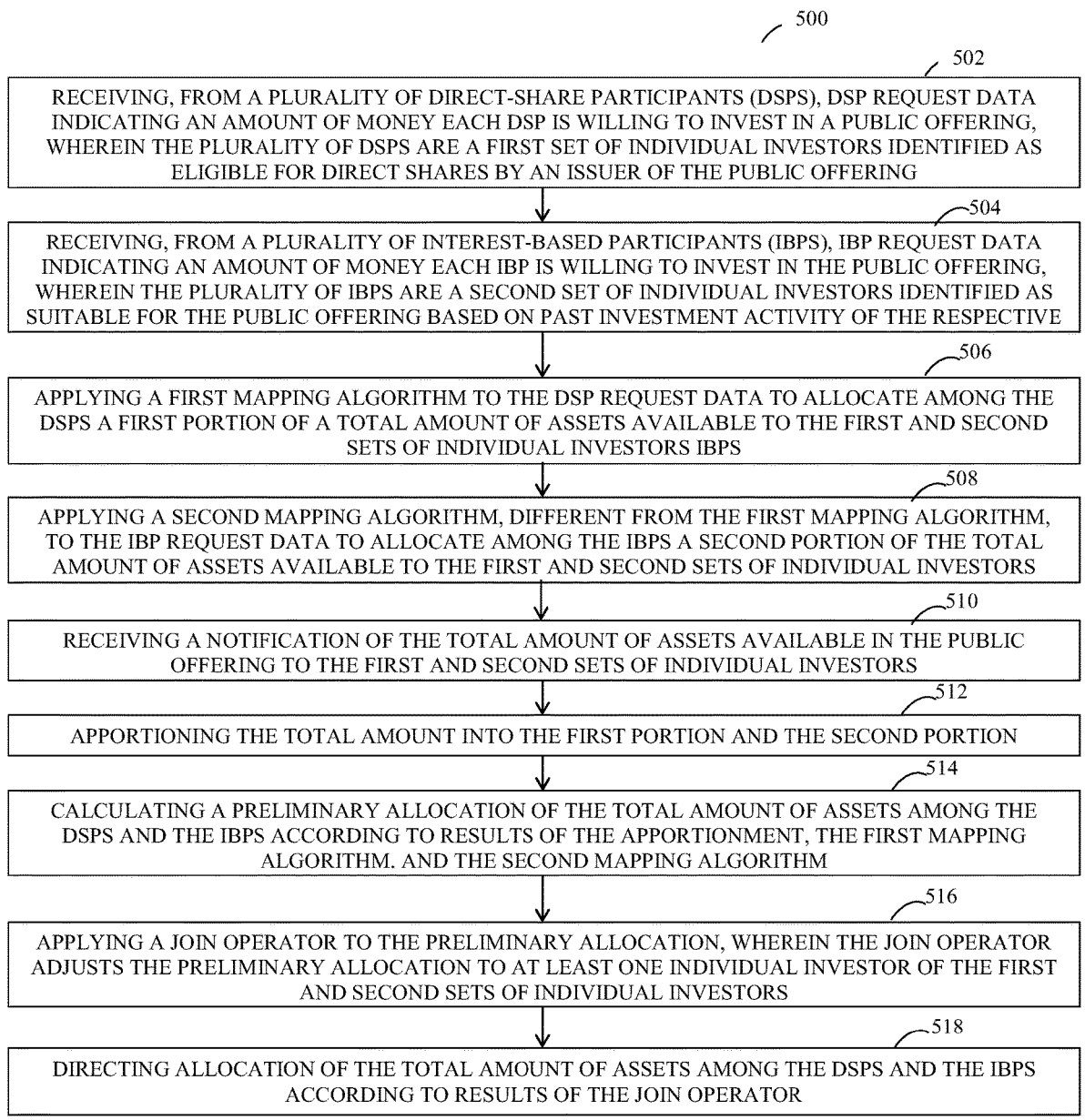
FIG. 5 is a flow diagram illustrating an example process by which assets may be allocated using the SDA computing device shown in FIG. 1.

FIG. 5 is a flow diagram illustrating an example process 500 by which assets may be allocated in a public offering using SDA computing device 108 (shown in FIG. 1).

In the example embodiment, method 500 includes receiving 502, from a plurality of direct-share participants (DSPs), DSP request data 204 indicating an amount of money each DSP is willing to invest in a public offering, wherein the plurality of DSPs are a first set of individual investors identified as eligible for directed shares by an issuer of the public offering and receiving 504, from a plurality of interest-based participants (IBPs), IBP request data 208 indicating an amount of money each IBP is willing to invest in the public offering, wherein the plurality of IBPs are a second set of individual investors identified as suitable for the public offering based on past investment activity of the respective IBPs. Method 500 also includes applying 506 a first mapping algorithm to DSP request data 204 to allocate among the DSPs a first portion of a total amount of assets available to the first and second sets of individual investors, applying 508 a second mapping algorithm, different from the first mapping algorithm, to IBP request data 208 to allocate among the IBPs a second portion of the total amount of assets available to the first and second sets of individual investors, and receiving 510 a notification of the total amount of assets available in the public offering to the first and second sets of individual investors. Method 500 further includes apportioning 512 the total amount into the first portion and the second portion, calculating 514 a preliminary allocation of the total amount of assets among the DSPs and the IBPs according to results of the apportionment, the first mapping algorithm, and the second mapping algorithm, applying 516 a join operator to the preliminary allocation wherein the join operator adjusts the preliminary allocation to at least one individual investor of the first and second sets of individual investors, and directing 518 allocation of the total amount of assets among the DSPs and the IBPs according to results of the join operator.

In some embodiments, method 500 includes the apportioning 512 of the total amount including a comparison of a sum of the amount of money the DSPs are willing to invest in the public offering and a sum of the amount of money the IBPs are willing to invest in the public offering.

In certain embodiments of method 500 the join operator is configured to establish a floor for the first portion at a threshold percentage of a sum of the amount of money the DSPs are willing to invest in the public offering. In some embodiments of method 500 the join operator is configured to cap the first portion at a threshold amount and/or adjust the amounts apportioned into the first portion and the second portion based at least in part on a pre-selected formula or issuer input.

In certain embodiments of method 500 the first mapping algorithm includes calculating a proportion of the amount of money each DSP is willing to invest to a sum of the amount of money the DSPs are willing to invest in the public offering wherein the first mapping algorithm includes an allocation bias received from the issuer and associated with at least one of the DSPs, the allocation bias applicable to adjust the calculated proportion of the at least one DSP.

In some embodiments, method 500 includes computing, by the at least one processor, for each of the IBPs, an investor score based on past investment activity of the respective IBP wherein the second mapping algorithm includes a comparison of the investor scores of each IBP.

Figure 6:
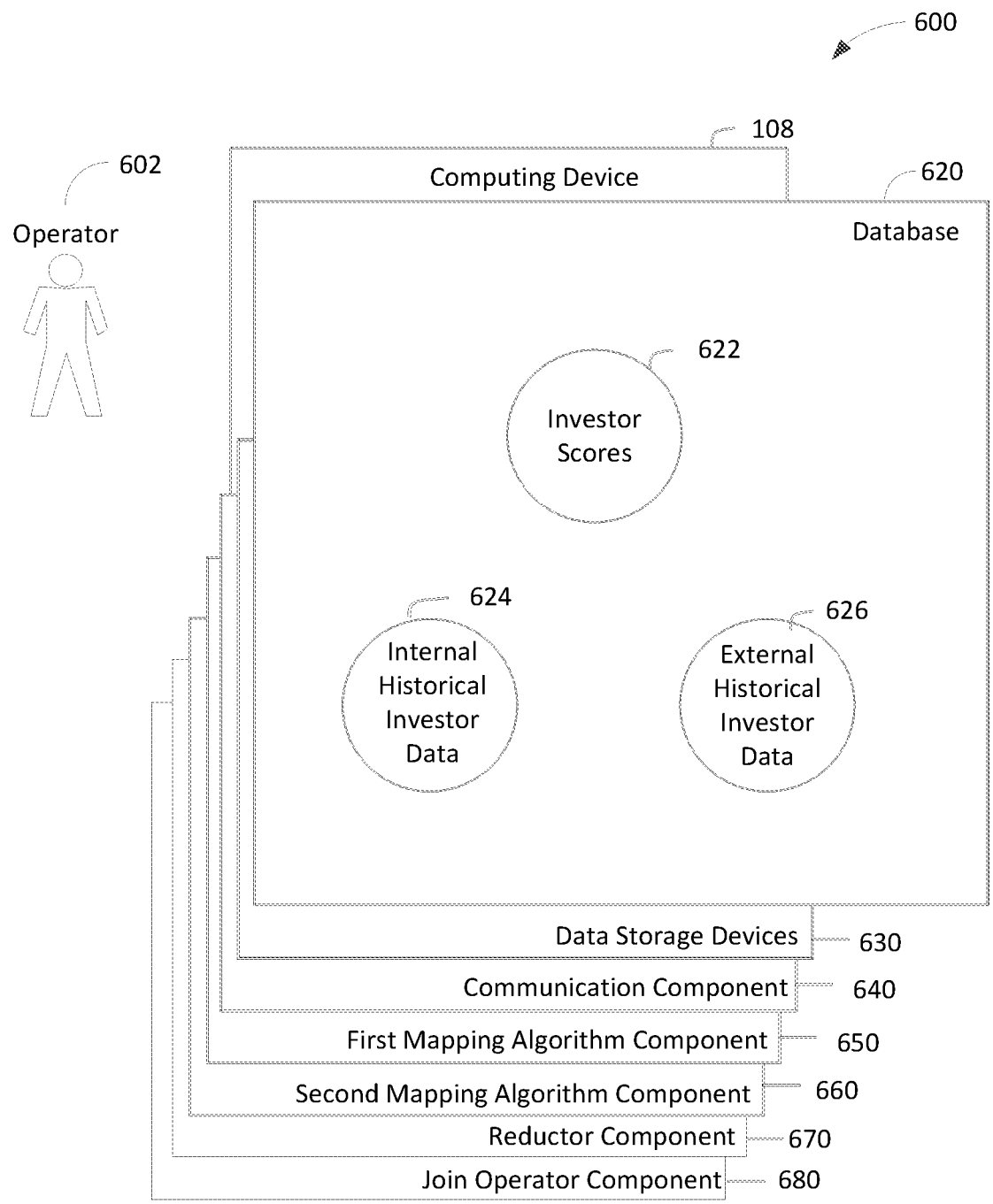
FIG. 6 is a diagram of example computer components that may be executed by the SDA computing device shown in FIG. 1.

FIG. 6 is a diagram 600 of example computer components that may be executed by SDA computing device 108. The computer components may be used to, for example, direct 518 allocation of assets among DSPs and IBPs (as shown in FIG. 5). An operator 602 may access SDA computing device 108 in order to initiate various operations and/or service SDA computing device 108. In some embodiments, database 620 is similar to database 218, as shown in FIG. 2. Database 620 may be implemented on one or more data storage devices 630 and coupled with several components within computing device 610, which perform specific tasks. In the example embodiment, database 620 includes internal historical investor data 624 and external historical investor data 626. In some embodiments, database 620 includes investor scores 622.

In the example embodiment, SDA computing device 108 includes a communication component 640 programmed to, as examples, receive 502 DSP request data, receive 504 IBP request data, and/or receive 510 a notification of the total amount of assets available in a public offering (as shown in FIG. 5).

In the example embodiment, SDA computing device 108 further includes a first mapping algorithm component 650 programmed to, as an example, apply 506 the first mapping algorithm to DSP request data (as shown in FIG. 5). SDA computing device 108 also includes a second mapping algorithm component 660 programmed to, as an example, apply 508 the second mapping algorithm, different from the first mapping algorithm, to IBP request data (as shown in FIG. 5).

In the example embodiment, SDA computing device 108 also includes a reductor component 670 (i.e., an apportioner component), for, as an example, apportioning 512 a total amount into a first portion and a second portion (as shown in FIG. 5). SDA computing device 108 further includes a join operator component 680 for, as an example, applying 516 a join operator to a preliminary allocation to adjust the preliminary allocation to at least one individual of a first and second set of individual investors (as shown in FIG. 5).

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of investor scoring. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the SDA computing device are described herein as including general processing and memory devices, it should be understood that the SDA computing device is a specialized computer configured to perform the steps described herein for the allocation of shares in a public offering including sets of individual investors in which the issuing company has different interests, in an integrated process, based on different mapping algorithms for each set of investors and join operators configured to re-balance allocations among individuals and/or groups according to special circumstances.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A share data allocation (SDA) computing device comprising at least one processor in communication with at least one memory, wherein the at least one processor configured to:
   transmit a link to a plurality of direct-share participant (DSP) computing devices associated with a plurality of DSPs, wherein the plurality of DSPs are a first set of individual investors identified as eligible for directed shares by an issuer of a public offering;
   provide an embedded frame for a broker-dealer application, wherein the embedded frame is configured to provide a communication channel between the SDA computing device and a plurality of interest-based participant (IBP) computing devices via the broker-dealer application, wherein the plurality of IBP computing devices are associated with a plurality of IBPs who are a second set of individual investors identified as suitable for the public offering based on past investment activity of the plurality of IBPs;
   receive, from at least a portion of the plurality of the DSP computing devices, DSP request data indicating an amount of money each DSP is willing to invest in the public offering;
   receive, from at least a portion of the plurality of IBP computing devices and based at least in part upon interaction between the portion of the plurality of IBP computing devices and the embedded frame, IBP request data indicating an amount of money each IBP is willing to invest in the public offering;
   apply one or more mapping algorithms to at least one of the DSP request data or the IBP request data to calculate a preliminary allocation of a total amount of assets among the DSPs and the IBPs; and
   transmit, to one or more of the plurality of DSP computing devices or the plurality of IBP computing devices, a notification associated with an allocation in the public offering to at least one individual investor, wherein the allocation includes an adjustment to the preliminary allocation to the at least one individual investor based upon a join operator.

2. The SDA computing device of claim 1, wherein the at least one processor is further configured to receive the DSP request data via the link.

3. The SDA computing device of claim 1, wherein the at least one processor is further configured to:
receive historical investor data comprising a plurality of data fields regarding past investment activity of each of the IBPs from a database; and
generate, in near real-time upon completion of asset offerings associated with the SDA computing device to provide a near real-time indication of investment behaviors for each of the IBPs participating in the asset offerings, an investor score based at least in part on the historical investor data.

4. The SDA computing device of claim 1, wherein the at least one processor is further configured to apply a first mapping algorithm to the DSP request data to allocate among the DSPs a first portion of the total amount of assets.

5. The SDA computing device of claim 4, wherein the first mapping algorithm includes an allocation bias received from the issuer and associated with at least one of the DSPs, and wherein the allocation bias applicable to adjust an allocation to the at least one of the DSPs.

6. The SDA computing device of claim 4, wherein the at least one processor is further configured to apply a second mapping algorithm, different from the first mapping algorithm, to the IBP request data to allocate among the IBPs a second portion of the total amount of assets.

7. The SDA computing device of claim 1, wherein the at least one processor is further configured to:
transmit preliminary allocation data regarding the preliminary allocation to an issuer computing device associated with the issuer;
receive review-based join operator data from the issuer computing device, wherein the review-based join operator data indicates one or more review-based inputs comprising one or more adjustments to the preliminary allocation; and
apply the join operator to the preliminary allocation to adjust the preliminary allocation based at least in part upon the review-based join operator data.

8. The SDA computing device of claim 1, wherein the at least one processor is further configured to transmit the embedded frame to a broker-dealer computing device associated with the broker-dealer application.

9. The SDA computing device of claim 1, wherein the at least one processor is further configured to cause allocation of the total amount of assets among the DSPs and the IBPs according to results of the join operator.

10. At least one non-transitory computer-readable storage medium with instructions stored thereon that, in response to execution by at least one processor, cause the at least one processor to:
transmit a link to a plurality of direct-share participant (DSP) computing devices associated with a plurality of DSPs, wherein the plurality of DSPs are a first set of individual investors identified as eligible for directed shares by an issuer of a public offering;
provide an embedded frame for a broker-dealer application, wherein the embedded frame is configured to provide a communication channel between the at least one processor and a plurality of interest-based participant (IBP) computing devices via the broker-dealer application, wherein the plurality of IBP computing devices are associated with a plurality of IBPs who are a second set of individual investors identified as suitable for the public offering based on past investment activity of the plurality of IBPs;
receive, from at least a portion of the plurality of the DSP computing devices, DSP request data indicating an amount of money each DSP is willing to invest in the public offering;
receive, from at least a portion of the plurality of IBP computing devices and based at least in part upon interaction between the portion of the plurality of IBP computing devices and the embedded frame, IBP request data indicating an amount of money each IBP is willing to invest in the public offering;
apply one or more mapping algorithms to at least one of the DSP request data or the IBP request data to calculate a preliminary allocation of a total amount of assets among the DSPs and the IBPs; and
transmit, to one or more of the plurality of DSP computing devices or the plurality of IBP computing devices, a notification associated with an allocation in the public offering to at least one individual investor, wherein the allocation includes an adjustment to the preliminary allocation to the at least one individual investor based upon a join operator.

11. The at least one non-transitory computer-readable storage medium of claim 10, wherein the instructions further cause the at least one processor to receive the DSP request data via the link.

12. The at least one non-transitory computer-readable storage medium of claim 10, wherein the instructions further cause the at least one processor to:
receive historical investor data comprising a plurality of data fields regarding past investment activity of each of the IBPs from a database; and
generate, in near real-time upon completion of asset offerings associated with the at least one processor to provide a near real-time indication of investment behaviors for each of the IBPs participating in the asset offerings, an investor score based at least in part on the historical investor data.

13. The at least one non-transitory computer-readable storage medium of claim 10, wherein the instructions further cause the at least one processor to apply a first mapping algorithm to the DSP request data to allocate among the DSPs a first portion of the total amount of assets.

14. The at least one non-transitory computer-readable storage medium of claim 13, wherein the first mapping algorithm includes an allocation bias received from the issuer and associated with at least one of the DSPs, and wherein the allocation bias applicable to adjust an allocation to the at least one of the DSPs.

15. The at least one non-transitory computer-readable storage medium of claim 13, wherein the instructions further cause the at least one processor to apply a second mapping algorithm, different from the first mapping algorithm, to the IBP request data to allocate among the IBPs a second portion of the total amount of assets.

16. The at least one non-transitory computer-readable storage medium of claim 10, wherein the instructions further cause the at least one processor to:
transmit preliminary allocation data regarding the preliminary allocation to an issuer computing device associated with the issuer;

receive review-based join operator data from the issuer computing device, wherein the review-based join operator data indicates one or more review-based inputs comprising one or more adjustments to the preliminary allocation; and apply the join operator to the preliminary allocation to adjust the preliminary allocation based at least in part upon the review-based join operator data.

17. The at least one non-transitory computer-readable storage medium of claim 10, wherein the instructions further cause the at least one processor to transmit the embedded frame to a broker-dealer computing device associated with the broker-dealer application.

18. The at least one non-transitory computer-readable storage medium of claim 10, wherein the instructions further cause the at least one processor to cause allocation of the total amount of assets among the DSPs and the IBPs according to results of the join operator.

19. A method implemented by at least one processor in communication with at least one memory, the method comprising:

transmitting a link to a plurality of direct-share participant (DSP) computing devices associated with a plurality of DSPs, wherein the plurality of DSPs are a first set of individual investors identified as eligible for directed shares by an issuer of a public offering;

providing an embedded frame for a broker-dealer application, wherein the embedded frame is configured to provide a communication channel between the at least one processor and a plurality of interest-based participant (IBP) computing devices via the broker-dealer application, wherein the plurality of IBP computing devices are associated with a plurality of IBPs who are a second set of individual investors identified as suitable for the public offering based on past investment activity of the plurality of IBPs;

receiving, from at least a portion of the plurality of the DSP computing devices, DSP request data indicating an amount of money each DSP is willing to invest in the public offering;

receiving, from at least a portion of the plurality of IBP computing devices and based at least in part upon interaction between the portion of the plurality of IBP computing devices and the embedded frame, IBP request data indicating an amount of money each IBP is willing to invest in the public offering;

applying one or more mapping algorithms to at least one of the DSP request data or the IBP request data to calculate a preliminary allocation of a total amount of assets among the DSPs and the IBPs; and transmitting, to one or more of the plurality of DSP computing devices or the plurality of IBP computing devices, a notification associated with an allocation in the public offering to at least one individual investor, wherein the allocation includes an adjustment to the preliminary allocation to the at least one individual investor based upon a join operator.

20. The method of claim 19, further comprising:

applying a first mapping algorithm to the DSP request data to allocate among the DSPs a first portion of the total amount of assets; and applying a second mapping algorithm, different from the first mapping algorithm, to the IBP request data to allocate among the IBPs a second portion of the total amount of assets.

* * * * *